(12) United States Patent
Takahashi

(10) Patent No.: US 9,725,553 B2
(45) Date of Patent: Aug. 8, 2017

(54) CATALYST COMPOSITION FOR PRODUCING POLYURETHANE RESIN, AND METHOD FOR PRODUCING POLYURETHANE RESIN USING SAID CATALYST COMPOSITION

(71) Applicant: TOSOH CORPORATION, Shunan-shi, Yamaguchi (JP)

(72) Inventor: Yoshihiro Takahashi, Shunan (JP)

(73) Assignee: TOSOH CORPORATION, Yamaguchi (JP)

( * ) Notice: Subject to any disclaimer, the term of this patent is extended or adjusted under 35 U.S.C. 154(b) by 174 days.

(21) Appl. No.: 14/411,736

(22) PCT Filed: Jun. 28, 2013

(86) PCT No.: PCT/JP2013/067871
§ 371 (c)(1),
(2) Date: Dec. 29, 2014

(87) PCT Pub. No.: WO2014/003177
PCT Pub. Date: Jan. 3, 2014

(65) Prior Publication Data
US 2015/0191565 A1    Jul. 9, 2015

(30) Foreign Application Priority Data

Jun. 29, 2012 (JP) ................. 2012-146992

(51) Int. Cl.
| | | |
|---|---|---|
| C08G 18/20 | (2006.01) | |
| C08G 18/18 | (2006.01) | |
| C08G 18/76 | (2006.01) | |
| C08G 18/10 | (2006.01) | |
| C08G 18/16 | (2006.01) | |
| C08G 18/28 | (2006.01) | |
| C08G 18/40 | (2006.01) | |

(Continued)

(52) U.S. Cl.
CPC ......... *C08G 18/2027* (2013.01); *C08G 18/10* (2013.01); *C08G 18/161* (2013.01); *C08G 18/168* (2013.01); *C08G 18/1808* (2013.01); *C08G 18/1825* (2013.01); *C08G 18/1858* (2013.01); *C08G 18/2018* (2013.01); *C08G 18/2063* (2013.01); *C08G 18/2865* (2013.01); *C08G 18/4009* (2013.01); *C08G 18/4804* (2013.01); *C08G 18/7621* (2013.01); *C08G 18/7657* (2013.01); *C08G 2101/005* (2013.01); *C08G 2101/0008* (2013.01); *C08G 2101/0058* (2013.01); *C08G 2101/0083* (2013.01)

(58) Field of Classification Search
CPC .... C08G 18/10; C08G 18/161; C08G 18/168; C08G 18/1808; C08G 18/1825; C08G 18/1858; C08G 18/2018; C08G 18/2027; C08G 18/2063; C08G 18/2865; C08G 18/4009; C08G 18/4804; C08G 18/7621; C08G 18/7657; C08G 2101/0008; C08G 2101/005; C08G 2101/0058; C08G 2101/0083

See application file for complete search history.

(56) References Cited

U.S. PATENT DOCUMENTS

| | | | |
|---|---|---|---|
| 4,757,105 A | 7/1988 | Kopp et al. | |
| 5,489,618 A * | 2/1996 | Gerkin | C08G 18/1875 521/117 |
| 6,660,781 B1 | 12/2003 | Ghobary et al. | |

(Continued)

FOREIGN PATENT DOCUMENTS

| | | |
|---|---|---|
| CA | 2123913 A1 | 6/1993 |
| JP | 7-233234 A | 9/1995 |

(Continued)

OTHER PUBLICATIONS

Communication dated Apr. 14, 2016 from the European Patent Office in counterpart application No. 13809945.2.
Keiji Iwata, "Polyurethane Resin Handbook", (1987 first edition), Nikkan Kogyo Shimbun, Ltd., p. 118.
International Search Report issued in PCT/JP2013/067871 dated Oct. 15, 2013.
Translation of International Preliminary Search Report on Patentability issued in PCT/JP2013/067871 dated Jan. 8, 2015.

*Primary Examiner* — John Cooney
(74) *Attorney, Agent, or Firm* — Sughrue Mion, PLLC

(57) ABSTRACT

To provide a catalyst composition excellent in cell openness properties and initial curing properties, and a method for producing a polyurethane resin using the same.

A catalyst composition comprising an amine compound (A) of the formula (1), a hydroxy acid (B) of the formula (2) and a tertiary amine compound (C) is used for the production of a polyurethane resin. [Each of $R_1$ and $R_2$ which are independent of each other, is a methyl group or an ethyl group, $R_3$ is a $C_{2-4}$ linear or branched alkyl group, $R_4$ is a $C_{1-18}$ bivalent hydrocarbon residue, m is an integer of from 1 to 3, and n is an integer of from 1 to 6.]

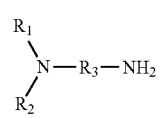

(1)

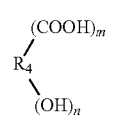

(2)

11 Claims, No Drawings

(51) Int. Cl.
   *C08G 18/48*   (2006.01)
   *C08G 101/00*   (2006.01)

(56) References Cited

U.S. PATENT DOCUMENTS

| | | | | |
|---|---|---|---|---|
| 2007/0249745 A1* | 10/2007 | Hofacker | ................. | A23G 4/06 521/155 |
| 2011/0294911 A1* | 12/2011 | Schoberger | ............ | A61L 15/26 521/70 |
| 2013/0136785 A1* | 5/2013 | Schonberger | ..... | A61F 13/00017 424/445 |

FOREIGN PATENT DOCUMENTS

| JP | 2001-181363 A | 7/2001 |
|---|---|---|
| JP | 2007-197532 A | 8/2007 |

* cited by examiner

CATALYST COMPOSITION FOR PRODUCING POLYURETHANE RESIN, AND METHOD FOR PRODUCING POLYURETHANE RESIN USING SAID CATALYST COMPOSITION

CROSS REFERENCE TO RELATED APPLICATIONS

This is a National Stage of International Application No. PCT/JP2013/067871 filed Jun. 28, 2013, claiming priority based on Japanese Patent Application No. 2012-146992 filed Jun. 29, 2012, the contents of all of which are incorporated herein by reference in their entirety.

TECHNICAL FIELD

The present invention relates to a catalyst composition for polyurethane resin production and a method for producing a polyurethane resin using the same.

The catalyst composition of the present invention is expected to be useful particularly as a catalyst for producing a flexible polyurethane foam.

BACKGROUND ART

A polyurethane resin is produced by reacting a polyol with a polyisocyanate in the presence of a catalyst and, as the case requires, a blowing agent, a surfactant, a flame retardant, a cross-linking agent, etc. It is known to employ many metal-type compounds or tertiary amine compounds as catalysts for the production of polyurethane resins. Such catalysts are also industrially employed frequently as used alone or in combination.

In the production of a polyurethane foam using water or a low boiling point organic compound as a blowing agent, among these catalysts, a tertiary amine compound is particularly widely used, since the productivity and moldability will be thereby excellent. As such a tertiary amine compound, for example, conventional triethylenediamine, N,N,N',N'-tetramethyl-1,6-hexanediamine, bis(2-dimethylaminoethyl) ether, N,N,N',N'',N''-pentamethyldiethylenetriamine, N-methylmorpholine, N-ethylmorpholine, or N,N-dimethylethanolamine, may be mentioned (see e.g. Non-patent Document 1).

In the case of a metal type compound, the productivity and moldability tend to be poor, and therefore, in most cases, a tertiary amine is used in combination as a catalyst, and it is rare that a metal type compound is used alone.

Polyurethane resins, particularly flexible and semirigid polyurethane foams, are light in weight and excellent in elasticity, and therefore they are widely used for products such as vehicles, furniture, bedclothes, cushions, etc. Among flexible polyurethane foams, a flexible molded foam is used mainly in the automobile cushion field, and a flexible slab foam is used mainly in the field of furniture, bedclothes, cushions, etc. A semirigid foam is used in the field of head rests, arm rests, instrument panels, etc. for automobiles.

For the production of a urethane foam, the balance of two main reactions is important.

The first one is called a urethanization reaction (so-called "gelling reaction"), which is a reaction of a polyol and an organic polyisocyanate to form a urethane polymer and thus contributes to formation of the structure.

The second one is called a urea-forming reaction (so-called "blowing reaction"), which is a reaction of water and an organic polyisocyanate to form a urea polymer and thus contributes to foaming.

In order to obtain a urethane foam having a good structure, the gelling reaction and the blowing reaction must proceed simultaneously and at the most well-balanced rates. For example, if the blowing reaction proceeds fast, foam tends to collapse. On the other hand, if the gelling reaction proceeds fast, blowing by carbon dioxide gas tends to be prevented and cells tend to be closed, whereby shrinkage is likely to occur, or a high density foam is likely to be formed.

In recent years, in a method for producing a flexible urethane foam by mold forming, for the purpose of improving the productivity or reducing the costs for the foam, a demand for a high speed demolding system is increasing. In order to speed up the production cycle, it is required to increase the reactivity and shorten the process time, and, for example, it has been attempted to meet such a requirement by using a catalyst having a high activity or increasing the amount of such a catalyst. However, if the forming time is shortened by using a catalyst having a high activity or increasing the amount of such a catalyst, the gelling reaction tends to increase, and cells of foam tend to be closed and shrink. Thus, if the reactions are speeded up, the balance of the two reactions at the time of producing a urethane foam tends to be lost, and if the gelling reaction precedes, the above problem is likely to result.

As a method for solving such problems, it has been proposed to carry out the reaction in the presence of a salt of a tertiary amine and a carboxylic acid having a hydroxyl functionality, as a catalyst (see e.g. Patent Document 1).

However, in the method disclosed in Patent Document 1, the cell openness properties of the catalyst (a phenomenon wherein closed-cells formed at the time of forming a flexible polyurethane foam are broken to form open-cells immediately before curing (gelling)) are still not sufficient, and besides, the initial curing properties have been weakened by improving the cell openness properties, whereby finger marks (marks by fingers which attach to the foam at the time of demolding) are likely to attach. Thus, a further improvement of the catalyst has been desired.

The present inventors have already filed a patent application (see Patent Document 2) relating to a method for producing a polyurethane resin, wherein an amine compound containing at least one primary amino group and at least one tertiary amino group in its molecule, and a tertiary amine compound having at least two hydroxyalkyl groups in its molecule, are used in combination, as amine catalysts.

However, the method disclosed in Patent Document 2 is a method for producing, with good productivity and moldability, a polyurethane resin which is free from generation of a volatile amine and which undergoes less deterioration of the physical properties, and thus, the problems to be solved are different from the present invention.

PRIOR ART DOCUMENTS

Patent Documents

Patent Document 1: JP-A-7-233234
Patent Document 2: Japanese Patent No. JP A 2001-181363

Non-Patent Document

Non-patent Document 1: Keiji Iwata, "Polyurethane Resin Handbook", (1987 first edition), Nikkan Kogyo Shimbun, Ltd., p. 118

DISCLOSURE OF INVENTION

Technical Problem

The present invention has been made in view of the above background art, and its object is to provide a catalyst composition to be used for the production of a polyurethane resin, and a method for producing a polyurethane resin excellent in the cell openness properties and also excellent in the initial curing properties, using the catalyst composition.

Solution to Problem

In order to solve the above problem, the present inventors have conducted an extensive study and as a result, have found a catalyst composition of the present invention and a method for producing a polyurethane resin using the same, and thus, the present invention has been accomplished.

That is, the present invention provides a catalyst composition for polyurethane resin production and a method for producing a polyurethane resin using the same, as described below.

[1] A catalyst composition for polyurethane resin production, which comprises an amine compound (A) represented by the following formula (1):

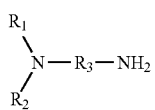  (1)

[In the formula (1), each of $R_1$ and $R_2$ which are independent of each other, is a methyl group or an ethyl group, and $R_3$ is a $C_{2-4}$ linear or branched alkyl group], a hydroxy acid (B) represented by the following formula (2):

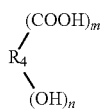  (2)

[In the formula (2), $R_4$ is a $C_{1-18}$ bivalent hydrocarbon residue, m is an integer of from 1 to 3, and n is an integer of from 1 to 6], and a tertiary amine compound (C).

[2] The catalyst composition for polyurethane resin production according to the above [1], wherein the mixing ratio of the amine compound (A), the hydroxy acid (B) and the tertiary amine compound (C) is within a range of [total content of the amine compound (A) and the hydroxy acid (B)]/[content of the tertiary amine compound (C)]=from 30/70 to 75/25 (molar ratio).

[3] The catalyst composition for polyurethane resin production according to the above [1] or [2], wherein the mixing ratio of the amine compound (A) and the hydroxy acid (B) is within a range of [content of the amine compound (A)]/[content of the hydroxy acid (B)]=from 30/70 to 90/10 (molar ratio).

[4] The catalyst composition for polyurethane resin production according to any one of the above [1] to [3], wherein the amine compound (A) is at least one member selected from the group consisting of N,N-dimethylethylenediamine, N,N-dimethylpropanediamine, N,N-diethylpropanediamine and N,N-dimethylbutanediamine.

[5] The catalyst composition for polyurethane resin production according to any one of the above [1] to [4], wherein the hydroxy acid (B) is at least one member selected from the group consisting of glyceric acid, hydroxybutyric acid, malic acid, salicylic acid, 3-hydroxybenzoic acid and 4-hydroxybenzoic acid.

[6] The catalyst composition for polyurethane resin production according to any one of [1] to [5], wherein the tertiary amine compound (C) is a tertiary amine compound with a value of [blowing reaction rate constant/gelling reaction rate constant] being at most 0.3.

[7] The catalyst composition for polyurethane resin production according to the above [6], wherein the tertiary amine compound with a value of [blowing reaction rate constant/gelling reaction rate constant] being at most 0.3 is at least one member selected from the group consisting of N,N,N',N'-tetramethylethylenediamine, N,N,N',N'-tetramethylhexamethylenediamine, triethylenediamine, 1,8-diazabicyclo[5.4.0]undecene-7 and 1,2-dimethylimidazole.

[8] A method for producing a polyurethane resin, which comprises reacting a polyol and an organic polyisocyanate in the presence of the catalyst composition as defined in any one of the above [1] to [7].

[9] The method for producing a polyurethane resin according to the above [8], wherein the amount of the catalyst composition to be used, is within a range of from 0.1 to 20 parts by weight per 100 parts by weight of the polyol.

[10] The method for producing a polyurethane resin according to the above [8] or [9], wherein the amount of the organic polyisocyanate to be used, is from 70 to 200 by isocyanate index.

[11] The method for producing a polyurethane resin according to any one of the above [8] to [10], wherein the reaction is conducted in the presence of a blowing agent.

[12] The method for producing a polyurethane resin according to any one of the above [8] to [11], wherein the blowing agent is water.

[13] A flexible polyurethane foam which is obtainable by the method as defined in any one of the above [8] to [12].

Advantageous Effects of Invention

The catalyst composition of the present invention serves to improve the productivity of a polyurethane resin, since it is thereby possible that when the starting material polyol and organic isocyanate are mixed, a mild blowing reaction is obtained in the initial reaction, and in the latter half of the reaction, the curing rate becomes fast, and the hardness of the foam will reach a sufficient level.

Further, the catalyst composition of the present invention serves not only to improve the productivity of a polyurethane resin but also to obtain a foam wherein cells are open for intercommunication and which is substantially free from shrinkage.

Furthermore, in the method for producing a polyurethane resin using the catalyst composition of the present invention, the curing properties immediately after demolding are excellent, and it is thereby possible to produce a flexible polyurethane foam which is less susceptible to finger marks (marks by fingers which are likely to attach to the foam during demolding).

DESCRIPTION OF EMBODIMENTS

Now, the present invention will be described in further detail.

The catalyst composition for polyurethane resin production of the present invention is characterized by comprising an amine compound (A) represented by the following formula (1), a hydroxyl acid (B) represented by the following formula (2) and a tertiary amine (C).

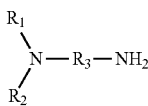
(1)

[In the formula (1), each of $R_1$ and $R_2$ which are independent of each other, is a methyl group or an ethyl group, and $R_3$ is a $C_{2-4}$ linear or branched alkyl group].

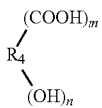
(2)

[In the formula (2), $R_4$ is a $C_{1-18}$ bivalent hydrocarbon residue, m is an integer of from 1 to 3, and n is an integer of from 1 to 6].

In the present invention, the amine compound (A) is a compound having at least one primary amino group and at least one tertiary amino group, and it is not particularly limited, but specifically, N,N-dimethylethylenediamine, N,N-dimethylpropanediamine, N,N-dimethylbutanediamine, N,N-diethylethylenediamine, N,N-diethylpropanediamine, N,N-dimethyl-1,2-propanediamine, N,N-diethyl-1,2-propanediamine, 2-(dimethylamino)-1-butaneamine, 2-(diethylamino)-1-butaneamine, etc. may be exemplified. Among them, N,N-dimethylethylenediamine, N,N-dimethylpropanediamine, N,N-diethylpropanediamine, N,N-dimethylbutanediamine, etc. are particularly preferred. As the amine compound (A), one of the above amine compounds may be used alone, or two or more of them may be used in combination.

In the present invention, the hydroxy acid (B) is not particularly limited, but specifically, glycolic acid, lactic acid, glyceric acid, 2-hydroxybutyric acid, 3-hydroxybutyric acid, γ-hydroxybutyric acid, malic acid, tartaric acid, citric acid, isocitric acid, mevalonic acid, pantoic acid, ricinoleic acid, quinic acid, shikimic acid, salicylic acid, vanillic acid, syringic acid, protocatechuic acid, gentisic acid, orsellinic acid, gallic acid, mandelic acid, benzilic acid, coumaric acid, caffeic acid, ferulic acid, 3-hydroxybenzoic acid, 4-hydroxybenzoic acid, etc. may be exemplified. Among them, glyceric acid, hydroxybutyric acid, malic acid, salicylic acid, 3-hydroxybenzoic acid, 4-hydroxybenzoic acid, etc. are particularly preferred. As the hydroxy acid (B), one of the above hydroxy acids may be used alone, or two or more of them may be used in combination.

In the present invention, the tertiary amine (C) may, for example, be a tertiary amine other than the amine compound (A) represented by the above formula (1), and for example, a compound which has at least one tertiary amino group but has no primary amino group, may be mentioned. Specifically, N,N,N',N'-tetramethylethylenediamine, N,N,N',N'-tetramethylpropanediamine, N,N,N',N",N"-pentamethyldiethylenetriamine, N,N,N',N",N"-pentamethyl-(3-aminopropyl)ethylenediamine, N,N,N',N",N"-pentamethyldipropylenetriamine, N,N,N',N'-tetramethylguanidine, 1,3,5-tris(N,N-dimethylaminopropyl)hexahydro-S-triazine, 1,8-diazabicyclo[5.4.0]undecene-7, triethylenediamine, N,N,N',N'-tetramethylhexamethylenediamine, N-methyl-N'-(2-dimethylaminoethyl)piperazine, N,N'-dimethylpiperazine, dimethylcyclohexylamine, N-methylmorpholine, N-ethylmorpholine, N—(N',N'-dimethylaminoethyl)morpholine, bis(2-dimethylaminoethyl)ether, 1-methylimidazole, 1,2-dimethylimidazole, 1-isobutyl-2-methylimidazole, 1-dimethylaminopropylimidazole, etc. may be mentioned.

Further, as the tertiary amine compound (C), a tertiary amine compound having a reactive group may also be used, and for example, dimethylaminoethanol, N,N-bis(3-dimethylaminopropyl)aminoethanol, dimethylisopropanolamine, N,N-dimethylhexanolamine, dimethylaminoethoxyethanol, N,N-dimethyl-N'-(2-hydroxyethyl)ethylenediamine, N,N-dimethyl-N'-(2-hydroxyethyl)propanediamine, N-methyl-N'-(2-hydroxyethyl)piperazine, bis(N,N-dimethyl-3-aminopropyl)amine, bis(dimethylaminopropyl)isopropanolamine, 1-(2-hydroxyethyl)imidazole, 1-(2-hydroxypropyl)imidazole, 1-(2-hydroxyethyl)-2-methylimidazole, 1-(2-hydroxypropyl)-2-methylimidazole, 1-(3-aminopropyl)imidazole, 3-quinuclidinol, etc. may be mentioned.

In the present invention, the tertiary amine compound (C) is preferably a tertiary amine compound with a value of [blowing reaction rate constant/gelling reaction rate constant] being at most 0.3. For example, N,N,N',N'-tetramethylethylenediamine, N,N,N',N'-tetramethylpropanediamine, N,N,N',N'-tetramethylhexamethylenediamine, bis(N,N-dimethyl-3-aminopropyl)amine, N,N,N',N'-tetramethylguanidine, triethylenediamine, N,N'-dimethylpiperazine, N-methylmorpholine, N-ethylmorpholine, N—(N',N'-dimethylaminoethyl)morpholine, 1,2-dimethylimidazole, 1-isobutyl-2-methylimidazole, 1,8-diazabicyclo[5.4.0]undecene-7,1-(3-aminopropyl)imidazole dimethylaminoethanol, N,N-bis(3-dimethylaminopropyl)aminoethanol, N-methyl-N'-(2-hydroxyethyl)piperazine, etc. may be mentioned. Among them, N,N,N',N'-tetramethylethylenediamine, N,N,N',N'-tetramethylhexamethylenediamine, triethylenediamine, 1,8-diazabicyclo[5.4.0]undecene-7,1,2-dimethylimidazole, etc. are particularly preferred. As the tertiary amine compound (C), one of the above tertiary amines may be used alone, or two or more of them may be used in combination.

In the present invention, the gelling reaction rate constant (k1w) is a parameter which is calculated by the following method. That is, toluene diisocyanate and diethylene glycol are charged so that [isocyanate groups]/[hydroxy groups] (molar ratio) would be 1.0, and as a catalyst, a tertiary amine compound is added in a predetermined amount, followed by a reaction in a benzene solvent while maintaining the temperature at a predetermined level, whereupon the amount of unreacted isocyanate is measured. Here, if it is assumed that the reaction of toluene diisocyanate and diethylene glycol is linear to the respective concentrations, the following equation holds.

$$dx/dt = k(a-x)^2 \quad (4)$$

x: concentration (mol/L) of reacted NCO groups
a: initial concentration (mol/L) of NCO groups
k: reaction rate constant (L/mol·h)
t: reaction time (h)

When t=0 and x=0 as initial conditions are substituted into the above equation (4), followed by integration, the following equation will hold.

$$1/(a-x) = kt + 1/a \quad (5)$$

From the above equation (5), the reaction rate constant k is obtained and substituted into the following equation to obtain a catalyst constant Kc.

$$k = k_o + K_c C \qquad (6)$$

ko: reaction rate constant (L/mol·h) in the absence of catalyst
Kc: catalyst constant (L²/g·mol·h)
C: catalyst concentration (mol/L) in reaction system The obtained catalyst constant Kc is divided by the molecular weight (mc) of the catalyst to obtain a gelling reaction rate constant k1w (L²/g·mol·h) which is deemed to be an activity power per weight [the following equation (7)].

$$Kc/mc = k1w \qquad (7)$$

On the other hand, the blowing reaction rate constant (k2w) is obtainable in the same manner as above, by reacting toluene diisocyanate and water in a benzene solvent under the same conditions as the above-described gelling reaction.

In the catalyst composition of the present invention, the mixing ratio of the amine compound (A), the hydroxy acid (B) and the tertiary amine compound (C) is not particularly limited, but it is preferably within a range of [total content of the amine compound (A) and the hydroxy acid (B)]/[content of the tertiary amine compound (C)]=from 30/70 to 75/25 (molar ratio), more preferably within a range of from 35/65 to 60/40 (molar ratio).

When this mixing ratio is made to be at least 30/70 (molar ratio), the cell openness properties of the polyurethane resin will be improved. On the other hand, when this compositional ratio is made to be at most 75/25 (molar ratio), the initial curing properties of the polyurethane resin will be made high.

Further, in the catalyst composition of the present invention, the mixing ratio of the amine compound (A) and the hydroxy acid (B) is not particularly limited, but it is preferably within a range of [content of the amine compound (A)]/[content of the hydroxy acid (B)]=from 30/70 to 90/10 (molar ratio), more preferably within a range of from 40/60 to 75/25 (molar ratio).

The method for preparing the catalyst composition of the present invention is not particularly limited, but it is preferred that a raw material composition comprising the amine compound (A), the hydroxy acid (B) and a solvent, is prepared, and this raw material composition and the tertiary amine compound (C) are mixed.

Here, the raw material composition can easily be prepared, for example, by weighing the amine compound (A) (e.g. N,N-dimethylpropanediamine or the like) and the hydroxy acid (B) (e.g. salicylic acid or the like) in a container (such as beaker or the like), and making them into a solution at optional concentrations by using a solvent.

The solvent to be used for this raw material composition is not particularly limited, and, for example, an organic solvent, such as an alcohol such as ethylene glycol, diethylene glycol, dipropylene glycol, propylene glycol, butanediol or 2-methyl-1,3-propanediol; a hydrocarbon such as toluene, xylene, mineral turpentine or mineral spirit; an ester such as ethyl acetate, butyl acetate, methylglycol acetate or cellosolve acetate; a ketone such as methyl ethyl ketone, methyl isobutyl ketone or cyclohexanone; or an amide such as N,N-dimethylformaldehyde or N,N-dimethylacetamide; or water, may be mentioned.

The present invention is one comprising the amine compound (A), the hydroxy acid (B) and the tertiary amine compound (C), as mentioned above, and it is not necessary to contain other catalyst. However, it is possible to use a conventional quaternary ammonium salt, organic metal compound or the like within a range not to depart from the concept of the present invention.

The quaternary ammonium salt is not particularly limited, and a tetraalkylammonium halide such as tetramethylammonium chloride; a tetraalkylammonium hydroxide such as tetramethylammonium hydroxide; or a tetraalkylammonium organic acid salt such as tetramethylammonium 2-ethylhexanoate, 2-hydroxypropyltrimethylammonium formate or 2-hydroxypropyltrimethylammonium 2-ethylhexanoate, may be mentioned.

The organic metal compound is not particularly limited, and, for example, stannous diacetate, stannous dioctoate, stannous dioleate, stannous dilaurate, dibutyltin oxide, dibutyltin diacetate, dibutyltin dilaurate, dibutyltin dichloride, dioctyltin dilaurate, lead octanoate, lead naphthenate, nickel naphthenate or cobalt naphthenate may be mentioned.

Now, the method for producing a polyurethane resin of the present invention will be described.

The method for producing a polyurethane resin of the present invention is characterized by reacting a polyol and an organic polyisocyanate in the presence of the above-described catalyst composition of the present invention, and, as the case requires, a blowing agent, surfactant, other conventional auxiliary agents, etc.

In the production method of the present invention, the amount of the catalyst composition of the present invention to be used, is not particularly limited and is within a range of usually from 0.1 to 20 parts by weight, preferably from 0.5 to 10 parts by weight, as the content of the amine compound (A) contained in the catalyst composition of the present invention, per 100 parts by weight of the polyol.

In the method for producing a polyurethane resin of the present invention, a polyether polyol to be used, is not particularly limited and may, for example, be one produced by an addition reaction of a compound having at least two active hydrogen groups (a polyhydric alcohol such as ethylene glycol, propylene glycol, glycerin, trimethylolpropane or pentaerythritol; an amine such as ethylenediamine; or an alkanolamine such as ethanolamine or diethanolamine, or the like, may be exemplified) as a starting material, with an alkylene oxide (ethylene oxide or propylene oxide may be exemplified) [see e.g. the method disclosed by Gunter Oertel, in "Polyurethane Handbook" (1985), Hanser Publishers (Germany), p. 42-53].

In the production method of the present invention, a polyester polyol to be used, is not particularly limited and may, for example, be a product obtainable from a reaction of a dibasic acid and glycol, or a polyester polyol obtained by treating a waste product such as a waste from nylon production, a waste of trimethylolpropane and pentaerythritol, or a waste of a phthalic acid type polyester [see e.g. the disclosure by Keiji Iwata, in "Polyurethane Resin Handbook" (1987), Nikkan Kogyo Shimbun, Ltd., p. 117].

In the method for producing a polyurethane resin of the present invention, a polymer polyol to be used, is not particularly limited and may, for example, be a polymer polyol obtained by reacting the above-mentioned polyether polyol with an ethylenically unsaturated monomer (e.g. butadiene, acrylonitrile or styrene) in the presence of a radical polymerization catalyst.

In the method for producing a polyurethane resin of the present invention, a flame-retardant polyol to be used, is not particularly limited and may, for example, be a phosphorus-containing polyol obtainable by adding an alkylene oxide to a phosphoric acid compound, a halogen-containing polyol obtainable by subjecting epichlorohydrin or trichlorobutylene oxide to ring-opening polymerization, or a phenol polyol.

In the method for producing a polyurethane resin of the present invention, it is possible to use a polyol having an average hydroxy value within a range of from 20 to 1,000 mgKOH/g. However, for a flexible polyurethane resin or a semi-rigid polyurethane resin, it is preferred to use one having an average hydroxy value within a range of from 20 to 100 mgKOH/g, and for a rigid polyurethane resin, it is preferred to use one having an average hydroxy value of from 100 to 800 mgKOH/g.

The organic polyisocyanate to be used in the present invention may be a conventional one and is not particularly limited, and, for example, an aromatic polyisocyanate such as toluene diisocyanate (TDI), diphenylmethane diisocyanate (MDI), naphthalene diisocyanate or xylylene diisocyanate; an aliphatic polyisocyanate such as hexamethylene diisocyanate; an alicyclic polyisocyanate such as dicyclohexyl diisocyanate or isophorone diisocyanate; and a mixture thereof, may be mentioned.

TDI and its derivatives may, for example, be a mixture of 2,4-toluene diisocyanate and 2,6-toluene diisocyanate, a terminal isocyanate prepolymer of TDI, etc. MDI and its derivatives may, for example, be a mixture of MDI and, as its polymer, polyphenyl-polymethylene diisocyanate, a diphenylmethane diisocyanate derivative having terminal isocyanate groups, etc.

Among these organic polyisocyanates, TDI or MDI is preferably used. For a flexible polyurethane foam, TDI, MDI or a combination thereof may be used.

In the production method of the present invention, the amount of the organic polyisocyanate is not particularly limited. However, in consideration of the strength of foam, completion of the isocyanurate reaction, etc., the isocyanate index of the polyisocyanate to an active hydrogen compound (e.g. a polyol or water) reactive therewith [=(isocyanate groups/active hydrogen groups reactive with the isocyanate groups) (molar ratio)×100] is usually preferably within a range of from 70 to 200, more preferably within a range of from 75 to 130.

As the blowing agent to be used in the method for producing a polyurethane resin of the present invention, a hydrocarbon type blowing agent, a halogenated hydrocarbon type blowing agent or water may, for example, be mentioned as a preferred one.

As the hydrocarbon type blowing agent, conventional methane, ethane, propane, butane, pentane or hexane may, for example, be used.

As the halogenated hydrocarbon type blowing agent, a conventional halogenated methane, halogenated ethane or fluorinated hydrocarbon (e.g. methylene chloride, HCFC-141b, HFC-245fa, HFC-356mfc, or the like) may, for example, be used.

In use of such blowing agents, the hydrocarbon type blowing agent, the halogenated hydrocarbon type blowing agent, water, etc. may, respectively, used alone, or they may be used in combination. A particularly preferred blowing agent is water. The amount of the blowing agent to be used, may vary depending upon the desired density of the product and is not particularly limited. However, it is usually at least 0.1 part by weight, preferably within a range of from 0.5 to 10 parts by weight, per 100 parts by weight of the polyol.

In the production method of the present invention, if necessary, it is possible to use a surfactant. The surfactant to be used in the present invention may, for example, be a conventional organic silicone surfactant, and its amount is usually within a range of from 0.1 to 10 parts by weight per 100 parts by weight of the polyol.

Further, in the production method of the present invention, if necessary, it is possible to use a cross-linking agent or chain extender. As the cross-linking agent or chain extender, for example, a low molecular weight polyhydric alcohol (e.g. ethylene glycol, 1,4-butanediol or glycerin), a low molecular weight amine polyol (e.g. diethanolamine or triethanolamine), or a polyamine (e.g. ethylenediamine, xylylenediamine or methylenebisorthochloroaniline) may be mentioned. Among them, diethanolamine or triethanolamine is preferred.

Further, in the production method of the present invention, as the case requires, it is possible to use a colorant, a flame-retardant, an anti-aging agent, other known additives, etc. The types and amounts of these additives may preferably be within the respective common ranges not to depart from the conventional types and procedures.

A product produced by the method for producing a polyurethane resin of the present invention may be used for various applications.

A flexible polyurethane foam may be used, for example, as a cushion, for beds, car seat mattresses, etc.

A semi-rigid polyurethane foam may be used, for example, for automobile-related instrument panels, head rests, steering wheels, etc.

Here, in the present invention, a flexible polyurethane foam means a reversibly deformable foam which usually has an open-cell structure and exhibits high air permeability as disclosed, for example, by Gunter Oertel in "Polyurethane Handbook" (1985 edition), Hanser Publishers (Germany), p. 161-233, or by Keiji Iwata in "Polyurethane Resin Handbook" (1987 first edition), Nikkan Kogyo Shimbun, Ltd., p. 150-221.

The physical properties of a flexible urethane foam are not particularly limited, and usually, the density is from 10 to 100 kg/m$^3$, the compression strength (ILD 25%) is from 200 to 8,000 kPa, and the elongation is within a range of from 80 to 500%.

In the present invention, the flexible polyurethane foam shall include a semi-rigid polyurethane foam from the materials to be used and the physical properties of foam.

Further, the semi-rigid polyurethane foam is a reversibly deformable foam which has an open-cell structure and exhibits high air permeability like the flexible polyurethane foam although the density and compression strength of foam are higher than the flexible polyurethane foam, as disclosed, for example, by Gunter Oertel in "Polyurethane Handbook" (1985 edition), Hanser Publishers (Germany), p. 223-233, or by Keiji Iwata in "Polyurethane Resin Handbook" (1987 first edition), Nikkan Kogyo Shimbun, Ltd., p. 211-221.

The polyol and isocyanate raw materials to be used for the production of a semi-rigid polyurethane foam are the same as for a flexible polyurethane foam, and therefore, such a semi-rigid polyurethane is usually classified in a flexible polyurethane foam.

The physical properties of a semi-rigid urethane foam are not particularly limited, and usually, the density is from 40 to 800 kg/m³, the compression strength (ILD 25%) is from 10 to 200 kPa, and the elongation is within a range of from 40 to 200%.

EXAMPLES

Now, the present invention will be described in further detail with reference to Examples and Comparative Examples, but it should be understood that the present invention is by no means limited to these Examples.

Examples 1 to 9, and Comparative Examples 1 to 5

By variously changing the catalyst composition, preparation of flexible polyurethane foams was carried out by the blend (ISOCYANATE INDEX=100) of the polyols and polyisocyanate as shown in Table 1.

TABLE 1

| | Parts by weight (pbw) |
|---|---|
| Polyether polyol[1] | 70 |
| Polyether polyol[2] | 30 |
| Cell opener[3] | 2 |
| Water | 3.3 |
| Surfactant[4] | 1 |
| MDI[5] | ISOCYANATE INDEX 100[6] |

[1] EXCENOL (EL837) manufactured by Asahi Glass Co., Ltd. (OH value = 27.3 mgKOH/g)
[2] EXCENOL (EL840) manufactured by Asahi Glass Co., Ltd. (OH value = 26.6 mgKOH/g)
[3] Toho Polyol (QB8000) manufactured by Toho Chemical Industry Co., Ltd. (OH value = 28 mgKOH/g)
[4] Nyax (Y10366) manufactured by Momentive Performance Materials Inc.
[5] Coronate (1316) manufactured by Nippon Polyurethane Industry Co., Ltd. (NCO content = 28.8%)
[6] ISOCYANATE INDEX = (number of moles of NCO groups/number of moles of OH groups) × 100

The catalyst composition was prepared by blending and dissolving the reagents shown in Table 2 to prepare a primary catalyst, and then, adding and dissolving the reagents shown in Table 3 in the solution of the primary catalyst to prepare a final catalyst, and was used for the preparation of a flexible polyurethane foam.

TABLE 2

| | Primary catalyst | | | | | | | | | |
|---|---|---|---|---|---|---|---|---|---|---|
| | C-1 | C-2 | C-3 | C-4 | C-5 | C-6 | C-7 | C-8 | C-9 | C-10 |
| Amine compound (A) | | | | | | | | | | |
| DMAPA[1] (wt %) | 22.4 | 25.7 | 30.0 | 34.1 | - | 20.8 | 20.8 | 20.7 | 16.6 | 13.3 |
| Hydroxy acid (B) | | | | | | | | | | |
| Salicylic acid (wt %) | 30.6 | 28.6 | 25.6 | 23.1 | 18.0 | 21.0 | 21.1 | 21.0 | 16.7 | 13.6 |
| Tertiary amine compound (C) | | | | | | | | | | |
| TEDA[2] (wt %) | — | — | — | — | 32.0 | — | — | — | — | — |
| Solvent | | | | | | | | | | |
| $H_2O$ (wt %) | 47.0 | 45.7 | 44.4 | 42.8 | 50.0 | 58.2 | 58.1 | 58.3 | 66.7 | 73.1 |
| (A)/(B) (molar ratio) | 50/50 | 55/45 | 61/39 | 67/33 | — | 57/43 | 57/43 | 57/43 | 57/43 | 57/43 |

[1] N,N'-dimethylpropanediamine (manufactured by Wako Pure Chemical Industries, Ltd.)
[2] Triethylenediamine (TEDA manufactured by Tosoh Corporation)

TABLE 3

| | Final catalyst | | | | | | | | | |
|---|---|---|---|---|---|---|---|---|---|---|
| | S-1 | S-2 | S-3 | S-4 | S-5 | S-6 | S-7 | S-8 | S-9 | S-10 |
| Primary catalyst | | | | | | | | | | |
| C-1 (wt %) | 75 | | | | | | | | | |
| C-2 (wt %) | | 77 | | | | | | | | |
| C-3 (wt %) | | | 80 | | | | | | | |
| C-4 (wt %) | | | | 83 | | | | | | |
| C-5 (wt %) | | | | | 100 | | | | | |
| C-6 (wt %) | | | | | | 79 | | | | |
| C-7 (wt %) | | | | | | | 75 | | | |
| C-8 (wt %) | | | | | | | | 70 | | |
| C-9 (wt %) | | | | | | | | | 70 | |
| C-10 (wt %) | | | | | | | | | | 70 |
| Tertiary amine compound (C) | | | | | | | | | | |
| TEDA (wt %) | 25 | 23 | 20 | 17 | — | 21 | 25 | 30 | 30 | 30 |
| [(A) + (B)]/(C) (molar ratio) | 60/40 | 63/37 | 68/32 | 74/26 | — | 60/40 | 55/45 | 48/52 | 43/57 | 37/63 |

(1) Triethylenediamine (TEDA manufactured by Tosoh Corporation)

Specifically, the flexible polyurethane foams were prepared under the following conditions.

<Blowing Conditions>

Temperature of raw material liquid: 20±1° C.

Stirring speed: 6,000 rpm (5 seconds)

Mold: 2 L polyethylene cup, aluminum mold (dimension: 25 cm×25 cm×8 cm)

Mold temperature: 60° C.

Further, with respect to the following items, measurements and evaluations were made.

<Measured Items>

(Reactivity)

By means of a 2 L polyethylene cup, a free rise foam was prepared, whereby cream time, gel time and rise time were measured.

Cream time: Starting time (seconds) for foaming. The time until foam starts to rise was measured by visual observation.

Gel time: The time (seconds) for change from a foaming state to a resinous state composition was measured. The gel time was judged by visual observation. An operation of sticking a stick (matchstick) into foam in a foaming state for about a few mm and then withdrawing it, was repeated, and when the foam changed to a resinous state composition, inside of the foam became retiform like spider's web, whereby the time for such change was taken as the gel time.

Rise time: The time until the rise of foam stops, was measured by a laser displacement sensor (Model: LF-2510, manufactured by Keyence Corporation).

(Free Foam Core Density)

By means of a 2 L polyethylene cup, free rise foam was prepared, and a portion protruding from the 2 L polyethylene cup was cut, and further, from such foam, a sample with a size of 7 cm×7 cm×15 cm was cut, whereupon with respect to such foam, the core density was measured.

(Overall Density of Mold Foam)

A sample was prepared by exerting packing by means of an aluminum mold (dimension of 25 cm×25 cm×8 cm), followed by a demolding time of 8 minutes, whereupon the overall density of the sample was measured.

(Cell Openness Properties and Initial Curing Properties of Foam)

A compression jig (a disk with a diameter of 20 cm) was mounted on a tensile tester (trade name: Tensilon RTM500, manufactured by A&D Company, Limited), and a foam immediately after demolding, prepared by exerting packing in an aluminum mold, followed by a demolding time of 4 minutes, was set thereon. To this foam, a compression operation was repeatedly applied 10 times by the compression jig under conditions of a compression ratio of 65% and a compression speed of 300 mm/min continuously from 1 minute after demolding, and the compression stress was measured for every compression time.

The compression stress measured for the first time, was taken as an index for the cell openness properties, and in the evaluation of the cell openness properties of foam, at most 69 kN/m$^2$ (one having a low compression stress) was judged to be good in the cell openness properties.

The compression stress measured for the 10th time, was taken as an index for the initial curing properties, and in the evaluation of the initial curing properties of foam, at least 15 kN/m$^2$ (one having a high compression stress) was judged to be good in the curing properties.

The measurement and evaluation results of the physical properties are together shown in Tables 4 and 5.

TABLE 4

|  | Examples | | | | Comparative Examples | | |
|---|---|---|---|---|---|---|---|
|  | 1 | 2 | 3 | 4 | 1 | 2 | 3 |
| Amount of catalyst added | | | | | | | |
| S-1 (parts by weight) | 1.27 | | | | | | |
| S-2 (parts by weight) | | 1.25 | | | | | |
| S-3 (parts by weight) | | | 1.30 | | | | |
| S-4 (parts by weight) | | | | 1.36 | | | |
| S-5 (parts by weight) | | | | | 1.82 | | |
| TEDA-L33[1] | | | | | | 0.99 | |
| TEDA (20% aqueous solution)[2] | | | | | | | 1.65 |
| Reactivity | | | | | | | |
| Cream time (sec) | 17 | 16 | 16 | 17 | 17 | 19 | 18 |
| Gel time (sec) | 77 | 78 | 78 | 77 | 76 | 78 | 79 |
| Rise time (sec) | 105 | 106 | 110 | 106 | 102 | 112 | 107 |
| Free foam core density (kg/m$^3$) | 41.0 | 40.4 | 40.0 | 40.9 | 40.6 | 41.6 | 42.1 |
| Mold foam overall density (kg/m$^3$) | 54.3 | 54.3 | 54.2 | 54.1 | 54.4 | 54.5 | 54.4 |
| Cell openness properties and initial curing properties of foam FTC (65% compression) | | | | | | | |
| Compression stress (first time) (kN/m$^2$) | 66 | 56 | 45 | 45 | 55 | 79 | 72 |
| Compression stress (10th time) (kN/m$^2$) | 17 | 16 | 15 | 15 | 12 | 21 | 20 |

[1]33 wt % dipropylene glycol solution of triethylenediamine (TEDA-L33 manufactured by Tosoh Corporation)
[2]20 wt % aqueous solution of triethylenediamine, triethylenediamine (TEDA manufactured by Tosoh Corporation)

TABLE 5

|  | Examples | | | | | Comparative Examples | |
|---|---|---|---|---|---|---|---|
|  | 5 | 6 | 7 | 8 | 9 | 4 | 5 |
| Amount of catalyst added | | | | | | | |
| S-6 (parts by weight) | 1.86 | | | | | | |
| S-7 (parts by weight) | | 1.57 | | | | | |

TABLE 5-continued

|  | Examples | | | | | Comparative Examples | |
|---|---|---|---|---|---|---|---|
|  | 5 | 6 | 7 | 8 | 9 | 4 | 5 |
| S-8 (parts by weight) |  |  | 1.23 |  |  |  |  |
| S-9 (parts by weight) |  |  |  | 1.20 |  |  |  |
| S-10 (parts by weight) |  |  |  |  | 1.19 |  |  |
| S-5 (parts by weight) |  |  |  |  |  | 1.90 |  |
| TEDA-L33[1] |  |  |  |  |  |  | 0.99 |
| Reactivity |  |  |  |  |  |  |  |
| Cream time (sec) | 16 | 17 | 17 | 16 | 17 | 16 | 16 |
| Gel time (sec) | 76 | 75 | 76 | 77 | 77 | 75 | 75 |
| Rise time (sec) | 103 | 100 | 102 | 104 | 106 | 101 | 101 |
| Free foam core density (kg/m$^3$) | 40.3 | 40.4 | 40.6 | 41.6 | 41.5 | 40.8 | 41.7 |
| Mold foam overall density (kg/m$^3$) | 54.1 | 54.2 | 54.3 | 54.6 | 54.7 | 54.3 | 54.4 |
| Cell openness properties and initial curing properties of foam |  |  |  |  |  |  |  |
| FTC (65% compression) |  |  |  |  |  |  |  |
| Compression stress (first time) (kN/m$^2$) | 51 | 55 | 53 | 60 | 69 | 67 | 84 |
| Compression stress (10th time) (kN/m$^2$) | 15 | 15 | 16 | 16 | 17 | 12 | 17 |

[1]33 wt % dipropylene glycol solution of triethylenediamine (TEDA-L33 manufactured by Tosoh Corporation)

From these Tables, it is evident that in Examples 1 to 9 wherein the catalyst compositions of the present invention, i.e. catalyst compositions comprising N,N-dimethylpropanediamine corresponding to the amine compound (A), salicylic acid corresponding to the hydroxy acid (B) and triethylenediamine corresponding to the tertiary amine compound (C), were used, the obtained flexible polyurethane foams were excellent in the cell openness properties and the initial curing properties.

On the other hand, in Comparative Examples 1 and 4 wherein the catalyst compositions comprising salicylic acid corresponding to the hydroxy acid (B) and triethylenediamine corresponding to the tertiary amine compound (C), were used without using the amine compound (A), the obtained flexible polyurethane foams were poor in the initial curing properties, although they are excellent in the cell openness properties.

In Comparative Examples 2, 3 and 5 wherein triethylenediamine corresponding to the tertiary amine compound (C) was used alone, the obtained polyurethane foams were poor in the cell openness properties, although they were excellent in the initial curing properties.

Examples 10 to 12

In the same manner as in Example 1, flexible polyurethane foams were prepared, and the measurements and evaluations of the physical properties were carried out.

The catalyst composition was prepared by blending and dissolving the reagents shown in Table 6 to prepare a primary catalyst, and then, adding and dissolving the reagent shown in Table 7 in the solution of the primary catalyst to prepare a final catalyst, and was used for the preparation of a flexible polyurethane foam.

TABLE 6

| Primary catalyst | C-11 | C-12 | C-13 |
|---|---|---|---|
| Amine compound (A) |  |  |  |
| DMAEA[1] (wt %) | 30.0 |  |  |
| DMABA[2] (wt %) |  | 30.0 |  |
| DEAPA[3] (wt %) |  |  | 30.0 |

TABLE 6-continued

| Primary catalyst | C-11 | C-12 | C-13 |
|---|---|---|---|
| Hydroxy acid (B) |  |  |  |
| Salicylic acid (wt %) | 29.6 | 22.5 | 20.0 |
| Solvent |  |  |  |
| H$_2$O (wt %) | 40.4 | 47.5 | 50.0 |
| (A)/(B) (molar ratio) | 61/39 | 61/39 | 67/33 |

[1]N,N-dimethylethylenediamine (manufactured by Wako Pure Chemical Industries, Ltd.)
[2]N,N-dimethylbutanediamine (manufactured by Wako Pure Chemical Industries, Ltd.)
[3]N,N-diethylpropanediamine (manufactured by Wako Pure Chemical Industries, Ltd.)

TABLE 7

| Final catalyst | S-11 | S-12 | S-13 |
|---|---|---|---|
| Primary catalyst |  |  |  |
| C-11 (wt %) | 72.4 |  |  |
| C-12 |  | 77.5 |  |
| C-13 |  |  | 79.5 |
| Tertiary amine compound (C) |  |  |  |
| TEDA[1] (wt %) | 27.6 | 22.5 | 20.5 |
| [(A) + (B)]/(C) (molar ratio) | 62/38 | 62/38 | 66/34 |

[1]Triethylenediamine (TEDA manufactured by Tosoh Corporation)

The measurement and evaluation results of the physical properties are together shown in Table 8.

TABLE 8

|  | Examples | | |
|---|---|---|---|
|  | 10 | 11 | 12 |
| Amount of catalyst added |  |  |  |
| S-11 (parts by weight) | 1.19 |  |  |
| S-12 (parts by weight) |  | 1.28 |  |
| S-13 (parts by weight) |  |  | 1.45 |
| Reactivity |  |  |  |
| Cream time (sec) | 16 | 16 | 17 |
| Gel time (sec) | 77 | 77 | 79 |
| Rise time (sec) | 108 | 106 | 111 |

TABLE 8-continued

|  | Examples | | |
| --- | --- | --- | --- |
|  | 10 | 11 | 12 |
| Free foam core density (kg/m$^3$) | 41.4 | 41.2 | 41.5 |
| Mold foam overall density (kg/m$^3$) | 54.2 | 54.6 | 54.3 |
| Cell openness properties and initial curing properties of foam FTC (65% compression) | | | |
| Compression stress (first time)(kN/m$^2$) | 65 | 67 | 68 |
| Compression stress (10th time)(kN/m$^2$) | 15 | 16 | 16 |

It is evident that in Examples 10 to 12 wherein catalyst compositions having the amine compound (A) changed from N,N-dimethylpropanediamine to N,N-dimethylethylenediamine, N,N-diethylpropanediamine or N,N-dimethylbutanediamine, were used, the obtained flexible polyurethane foams were excellent in the cell openness properties and the initial curing properties.

Examples 13 to 17

In the same manner as in Example 1, flexible polyurethane foams were prepared, and the measurements and evaluations of the physical properties were carried out.

The catalyst composition was prepared by blending and dissolving the reagents shown in Table 9 to prepare a primary catalyst, and then, adding and dissolving the reagent shown in Table 10 in the solution of the primary catalyst to prepare a final catalyst, and was used for the preparation of a flexible polyurethane foam.

TABLE 9

| Primary catalyst | C-14 | C-15 | C-16 | C-17 | C-18 |
| --- | --- | --- | --- | --- | --- |
| Amine compound (A) | | | | | |
| DMAPA$^{(1)}$ (wt %) | 30.0 | 30.0 | 30.0 | 30.0 | 30.0 |
| Hydroxy acid (B) | | | | | |
| Glyceric acid | 19.6 | | | | |
| Hydroxybutyric acid (wt %) | | 19.3 | | | |

TABLE 9-continued

| Primary catalyst | C-14 | C-15 | C-16 | C-17 | C-18 |
| --- | --- | --- | --- | --- | --- |
| Malic acid | | | 24.8 | | |
| 3-Hydroxybenzoic acid | | | | 25.6 | |
| 4-Hydroxybenzoic acid | | | | | 25.6 |
| Solvent | | | | | |
| H$_2$O (wt %) | 50.4 | 50.7 | 45.2 | 44.4 | 44.4 |
| (A)/(B) (molar ratio) | 61/39 | 61/39 | 61/39 | 61/39 | 61/39 |

$^{(1)}$N,N-dimethylpropanediamine (manufactured by Wako Pure Chemical Industries, Ltd.)

TABLE 10

| Final catalyst | S-14 | S-15 | S-16 | S-17 | S-18 |
| --- | --- | --- | --- | --- | --- |
| Primary catalyst | | | | | |
| C-14 (wt %) | 80 | | | | |
| C-15 (wt %) | | 80 | | | |
| C-16 (wt %) | | | 80 | | |
| C-17 (wt %) | | | | 80 | |
| C-18 (wt %) | | | | | 80 |
| Tertiary amine compound (C) | | | | | |
| TEDA$^{(1)}$ (wt %) | 20 | 20 | 20 | 20 | 20 |
| [(A) + (B)]/(C) (molar ratio) | 68/32 | 68/32 | 68/32 | 68/32 | 68/32 |

$^{(1)}$Triethylenediamine (TEDA manufactured by Tosoh Corporation)

The measurement and evaluation results of the physical properties are together shown in Table 11.

TABLE 11

|  | Examples | | | | |
| --- | --- | --- | --- | --- | --- |
|  | 13 | 14 | 15 | 16 | 17 |
| Amount of catalyst added | | | | | |
| S-14 (parts by weight) | 1.29 | | | | |
| S-15 (parts by weight) | | 1.28 | | | |
| S-16 (parts by weight) | | | 1.32 | | |
| S-17 (parts by weight) | | | | 1.34 | |
| S-18 (parts by weight) | | | | | 1.38 |
| Reactivity | | | | | |
| Cream time (sec) | 16 | 16 | 15 | 16 | 16 |
| Gel time (sec) | 77 | 78 | 76 | 77 | 78 |
| Rise time (sec) | 108 | 104 | 102 | 105 | 110 |
| Free foam core density (kg/m$^3$) | 41.3 | 41.0 | 40.9 | 41.2 | 41.8 |
| Mold foam overall density (kg/m$^3$) | 54.4 | 54.3 | 54.6 | 54.3 | 54.5 |
| Cell openness properties and initial curing properties of foam FTC (65% compression) | | | | | |
| Compression stress (first time)(kN/m$^2$) | 47 | 45 | 46 | 47 | 49 |
| Compression stress (10th time)(kN/m$^2$) | 16 | 16 | 15 | 15 | 16 |

It is evident that in Examples 13 to 17 wherein catalyst compositions having the hydroxy acid (B) changed from salicylic acid to glyceric acid, hydroxybutyric acid, malic acid, tartaric acid, salicylic acid, 3-hydroxybenzoic acid or 4-hydroxybenzoic acid, were used, the obtained flexible polyurethane foams were excellent in the cell openness properties and the initial curing properties.

Examples 18 to 20

In the same manner as in Example 1, flexible polyurethane foams were prepared, and the measurements and evaluations of the physical properties were carried out.

The catalyst composition was prepared by adding and dissolving the reagent shown in Table 12 in the solution of the primary catalyst (C-3) to prepare a final catalyst, and was used for the preparation of a flexible polyurethane foam.

TABLE 12

| Final catalyst | S-19 | S-20 | S-21 |
|---|---|---|---|
| Primary catalyst | | | |
| C-3 (wt %) | 74.6 | 49.4 | 78.0 |
| Tertiary amine compound (C) | | | |
| TMEDA[(1)] (wt %) | 25.4 | | |
| TMHMDA[(2)] (wt %) | | 50.6 | |
| DMIZ[(3)] (wt %) | | | 22.0 |
| [(A) + (B)]/(C) (molar ratio) | 62/38 | 45/55 | 62/38 |

[(1)]N,N,N',N'-tetramethylethylenediamine (TOYOCAT-TE manufactured by Tosoh Corporation)
[(2)]N,N,N',N'-tetramethylhexamethylenediamine (TOYOCAT-MR manufactured by Tosoh Corporation)
[(3)]1,2-Dimethylimidazole (TOYOCAT-DMI manufactured by Tosoh Corporation)

The measurement and evaluation results of the physical properties are together shown in Table 13.

TABLE 13

| | Examples | | |
|---|---|---|---|
| | 18 | 19 | 20 |
| Amount of catalyst added | | | |
| S-19 (parts by weight) | 1.34 | | |
| S-20 (parts by weight) | | 1.15 | |
| S-21 (parts by weight) | | | 1.40 |
| Reactivity | | | |
| Cream time (sec) | 16 | 15 | 17 |
| Gel time (sec) | 77 | 76 | 78 |
| Rise time (sec) | 102 | 99 | 105 |
| Free foam core density (kg/m$^3$) | 40.7 | 40.2 | 40.9 |
| Mold foam overall density (kg/m$^3$) | 54.6 | 54.7 | 54.5 |
| Cell openness properties and initial curing properties of foam | | | |
| FTC (65% compression) | | | |
| Compression stress (first time)(kN/m$^2$) | 66 | 69 | 65 |
| Compression stress (10th time)(kN/m$^2$) | 15 | 17 | 16 |

It is evident that in Examples 18 to 20 wherein catalyst compositions having the tertiary amine compound (C) changed from triethylenediamine to N,N,N',N'-tetramethylethylenediamine, N,N,N',N'-tetramethylhexamethylenediamine or 1,2-dimethylimidazole, were used, the obtained flexible polyurethane foams were excellent in the cell openness properties and the initial curing properties.

Comparative Examples 6 to 19

In the same manner as in Example 1, flexible polyurethane foams were prepared, and the measurements and evaluations of the physical properties were carried out.

The catalyst composition was prepared by blending and dissolving the reagents shown in Table 14, and was used for the preparation of a flexible polyurethane foam.

TABLE 14

| | Catalyst | | | | | | | | | | | | | |
|---|---|---|---|---|---|---|---|---|---|---|---|---|---|---|
| | S-22 | S-23 | S-24 | S-25 | S-26 | S-27 | S-28 | S-29 | S-30 | S-31 | S-32 | S-33 | S-34 | S-35 |
| Tertiary amine compound (C) | | | | | | | | | | | | | | |
| TEDA[(1)] (wt %) | 20.0 | 30.0 | 30.0 | 30.0 | 30.0 | 30.0 | 30.0 | 30.0 | 30.0 | 30.0 | 30.0 | 30.0 | 30.0 | 30.0 |
| Organic acid | | | | | | | | | | | | | | |
| Formic acid (wt %) | | 8.2 | | | | | | | | | | | | |
| 2-Ethylhexanoic acid (wt %) | | | 25.7 | | | | | | | | | | | |
| Sebacic acid (wt %) | | | | 36.1 | | | | | | | | | | |
| Gluconic acid (wt %) | | | | | 35.0 | | | | | | | | | |
| Malic acid (wt %) | | | | | | 23.9 | | | | | | | | |
| Glycine (wt %) | | | | | | | 13.4 | | | | | | | |
| Alanine (wt %) | | | | | | | | 15.9 | | | | | | |
| Triazole (wt %) | | | | | | | | | 12.3 | | | | | |
| Salicylic acid (wt %) | | | | | | | | | | 24.6 | | | | |
| Benzoic acid (wt %) | | | | | | | | | | | 21.8 | | | |
| Phthalic acid (wt %) | | | | | | | | | | | | 29.6 | | |
| Isophthalic acid (wt %) | | | | | | | | | | | | | 29.6 | |
| Boric acid (wt %) | | | | | | | | | | | | | | 11.0 |
| Solvent | | | | | | | | | | | | | | |
| H$_2$O | 80.0 | 61.8 | 44.3 | 33.9 | 35.0 | 46.1 | 56.6 | 54.1 | 57.7 | 45.4 | 48.2 | 40.4 | 40.4 | 59.0 |
| Organic acid/(C) (molar ratio) | — | 29/71 | 29/71 | 29/71 | 29/71 | 29/71 | 29/71 | 29/71 | 29/71 | 29/71 | 29/71 | 29/71 | 29/71 | 29/71 |

[(1)]Triethylenediamine (TEDA manufactured by Tosoh Corporation)

The measurement and evaluation results of the physical properties are together shown in Table 15.

failed to have both the cell openness properties and the initial curing properties improved simultaneously.

TABLE 15

| | Comparative Examples | | | | | | | | | | | | | |
|---|---|---|---|---|---|---|---|---|---|---|---|---|---|---|
| | 6 | 7 | 8 | 9 | 10 | 11 | 12 | 13 | 14 | 15 | 16 | 17 | 18 | 19 |
| Amount of catalyst added | | | | | | | | | | | | | | |
| S-22 (parts by weight) | 1.65 | | | | | | | | | | | | | |
| S-23 (parts by weight) | | 1.90 | | | | | | | | | | | | |
| S-24 (parts by weight) | | | 1.21 | | | | | | | | | | | |
| S-25 (parts by weight) | | | | 2.78 | | | | | | | | | | |
| S-26 (parts by weight) | | | | | 3.50 | | | | | | | | | |
| S-27 (parts by weight) | | | | | | 3.45 | | | | | | | | |
| S-28 (parts by weight) | | | | | | | 2.50 | | | | | | | |
| S-29 (parts by weight) | | | | | | | | 2.65 | | | | | | |
| S-30 (parts by weight) | | | | | | | | | 1.02 | | | | | |
| S-31 (parts by weight) | | | | | | | | | | 2.70 | | | | |
| S-32 (parts by weight) | | | | | | | | | | | 1.84 | | | |
| S-33 (parts by weight) | | | | | | | | | | | | 2.33 | | |
| S-34 (parts by weight) | | | | | | | | | | | | | 5.10 | |
| S-35 (parts by weight) | | | | | | | | | | | | | | 1.10 |
| Reactivity | | | | | | | | | | | | | | |
| Cream time (sec) | 17 | 28 | 19 | 23 | 18 | 18 | 17 | 17 | 17 | 18 | 19 | 25 | 21 | 17 |
| Gel time (sec) | 78 | 77 | 77 | 76 | 76 | 78 | 77 | 75 | 75 | 76 | 78 | 77 | 78 | 75 |
| Rise time (sec) | 108 | 102 | 104 | 100 | 102 | 99 | 103 | 100 | 101 | 103 | 100 | 93 | 96 | 96 |
| Free foam core density ($kg/m^3$) | 42.6 | 43.3 | 43.1 | 42.5 | 44.3 | 41.9 | 42.3 | 40.9 | 43.5 | 40.7 | 41.4 | 43.0 | 41.1 | 41.7 |
| Mold foam overall density ($kg/m^3$) | 54.3 | 54.4 | 54.6 | 54.4 | 54.6 | 54.3 | 54.2 | 54.3 | 54.8 | 54.4 | 54.4 | 54.2 | 54.3 | 54.1 |
| Cell openness properties and initial curing properties of foam | | | | | | | | | | | | | | |
| FTC (65% compression) | | | | | | | | | | | | | | |
| Compression stress (first time) ($kN/m^2$) | 73 | 75 | 70 | 71 | 66 | 65 | 88 | 90 | 85 | 66 | 67 | 76 | 87 | 73 |
| Compression stress (10th time) ($kN/m^2$) | 18 | 19 | 17 | 16 | 14 | 13 | 18 | 17 | 19 | 12 | 14 | 17 | 19 | 18 |

In Comparative Example 6 wherein triethylenediamine corresponding to the tertiary amine compound (C) was used alone, the obtained flexible polyurethane foam was poor in the cell openness properties, although it was excellent in the initial curing properties.

In Comparative Examples 7 to 19 wherein catalyst compositions having triethylenediamine corresponding to the tertiary amine compound (C) mixed with various organic acids, were used, the obtained flexible polyurethane foams Comparative Examples 20 to 33

In the same manner as in Example 1, flexible polyurethane foams were prepared, and the measurements and evaluations of the physical properties were carried out.

The catalyst composition was prepared by blending and dissolving the reagents shown in Table 16, and was used for the preparation of a flexible polyurethane foam.

TABLE 16

| | Catalyst | | | | | | | | | | | | | |
|---|---|---|---|---|---|---|---|---|---|---|---|---|---|---|
| | S-36 | S-37 | S-38 | S-39 | S-40 | S-41 | S-42 | S-43 | S-44 | S-45 | S-46 | S-47 | S-48 | S-49 |
| Tertiary amine compound (C) | | | | | | | | | | | | | | |
| DMAPA[(1)] (wt %) | 40.0 | 40.0 | 40.0 | 40.0 | 40.0 | 40.0 | 40.0 | 40.0 | 40.0 | 40.0 | 40.0 | 40.0 | 40.0 | 40.0 |
| Organic acid | | | | | | | | | | | | | | |
| Formic acid (wt %) | | 7.7 | | | | | | | | | | | | |
| 2-Ethylhexanoic acid (wt %) | | | 24.2 | | | | | | | | | | | |
| Sebacic acid (wt %) | | | | 33.9 | | | | | | | | | | |
| Gluconic acid (wt %) | | | | | 32.9 | | | | | | | | | |
| Malic acid (wt %) | | | | | | 22.5 | | | | | | | | |
| Glycine (wt %) | | | | | | | 12.6 | | | | | | | |
| Alanine (wt %) | | | | | | | | 15.0 | | | | | | |
| Triazole (wt %) | | | | | | | | | 11.6 | | | | | |
| Salicylic acid (wt %) | | | | | | | | | | 23.2 | | | | |
| Benzoic acid (wt %) | | | | | | | | | | | 20.5 | | | |

TABLE 16-continued

| | Catalyst | | | | | | | | | | | | | |
|---|---|---|---|---|---|---|---|---|---|---|---|---|---|---|
| | S-36 | S-37 | S-38 | S-39 | S-40 | S-41 | S-42 | S-43 | S-44 | S-45 | S-46 | S-47 | S-48 | S-49 |
| Phthalic acid (wt %) | | | | | | | | | | | | 27.9 | | |
| Isophthalic acid (wt %) | | | | | | | | | | | | | 27.9 | |
| Boric acid (wt %) | | | | | | | | | | | | | | 10.4 |
| Solvent | | | | | | | | | | | | | | |
| H$_2$O (wt %) | 60.0 | 52.3 | 35.8 | 26.1 | 27.1 | 37.5 | 47.4 | 45.0 | 48.4 | 36.8 | 39.5 | 32.1 | 32.1 | 49.6 |
| Organic acid/(A) (molar ratio) | — | 23/77 | 23/77 | 23/77 | 23/77 | 23/77 | 23/77 | 23/77 | 23/77 | 23/77 | 23/77 | 23/77 | 23/77 | 23/77 |

[1]N,N-dimethylpropanediamine (manufactured by Wako Pure Chemical Industries, Ltd.)

The measurement and evaluation results of the physical properties are together shown in Table 17.

TABLE 17

| | Comparative Examples | | | | | | | | | | | | | |
|---|---|---|---|---|---|---|---|---|---|---|---|---|---|---|
| | 20 | 21 | 22 | 23 | 24 | 25 | 26 | 27 | 28 | 29 | 30 | 31 | 32 | 33 |
| Amount of catalyst added | | | | | | | | | | | | | | |
| S-36 (parts by weight) | 2.25 | | | | | | | | | | | | | |
| S-37 (parts by weight) | | 2.60 | | | | | | | | | | | | |
| S-38 (parts by weight) | | | 1.65 | | | | | | | | | | | |
| S-39 (parts by weight) | | | | 2.52 | | | | | | | | | | |
| S-40 (parts by weight) | | | | | 4.78 | | | | | | | | | |
| S-41 (parts by weight) | | | | | | 4.70 | | | | | | | | |
| S-42 (parts by weight) | | | | | | | 3.40 | | | | | | | |
| S-43 (parts by weight) | | | | | | | | 3.62 | | | | | | |
| S-44 (parts by weight) | | | | | | | | | 1.40 | | | | | |
| S-45 (parts by weight) | | | | | | | | | | 3.40 | | | | |
| S-46 (parts by weight) | | | | | | | | | | | 2.50 | | | |
| S-47 (parts by weight) | | | | | | | | | | | | 3.18 | | |
| S-48 (parts by weight) | | | | | | | | | | | | | 7.00 | |
| S-49 (parts by weight) | | | | | | | | | | | | | | 1.50 |
| Reactivity | | | | | | | | | | | | | | |
| Cream time (sec) | 15 | 21 | 16 | 17 | 15 | 15 | 14 | 15 | 14 | 13 | 15 | 19 | 16 | 14 |
| Gel time (sec) | 77 | 79 | 78 | 77 | 78 | 77 | 79 | 80 | 77 | 81 | 78 | 80 | 79 | 78 |
| Rise time (sec) | 90 | 97 | 93 | 101 | 104 | 100 | 96 | 102 | 98 | 115 | 110 | 100 | 96 | 99 |
| Free foam core density (kg/m$^3$) | 44.4 | 44.8 | 44.6 | 43.9 | 45.9 | 43.6 | 43.9 | 42.7 | 44.9 | 42.3 | 42.8 | 44.7 | 42.7 | 43.1 |
| Mold foam overall density (kg/m$^3$) | 54.9 | 54.6 | 54.8 | 54.7 | 55.1 | 55.0 | 54.8 | 55.0 | 54.8 | 54.8 | 54.9 | 54.6 | 55.2 | 54.9 |
| Cell openness properties and initial curing properties of foam | | | | | | | | | | | | | | |
| FTC (65% compression) | | | | | | | | | | | | | | |
| Compression stress (first time) (kN/m$^2$) | 12 | 13 | 12 | 9 | 7 | 8 | 14 | 15 | 15 | 7 | 9 | 12 | 14 | 13 |
| Compression stress (10th time) (kN/m$^2$) | 12 | 13 | 12 | 10 | 8 | 9 | 11 | 12 | 13 | 8 | 10 | 12 | 13 | 13 |

In Comparative Example 20 wherein N,N-dimethylpropanediamine corresponding to the amine compound (A) was used alone, the obtained flexible polyurethane foam was poor in the initial curing properties, although it was excellent in the cell openness properties.

In Comparative Examples 21 to 33 wherein catalyst compositions having N,N-dimethylpropanediamine corresponding to the amine compound (A) mixed with various organic acids, were used, the obtained flexible polyurethane foams were poor in the initial curing properties, although they were excellent in the cell openness properties.

Comparative Examples 34 to 37

In the same manner as in Example 1, flexible polyurethane foams were prepared, and the measurements and evaluations of the physical properties were carried out.

The catalyst composition was prepared by blending and dissolving the reagents shown in Table 18, and was used for the preparation of a flexible polyurethane foam.

TABLE 18

| Catalyst | S-50 | S-51 | S-52 | S-53 |
|---|---|---|---|---|
| Hydroxy acid (B) | | | | |
| Salicylic acid (wt %) | — | 6.2 | 12.5 | 18.5 |
| Tertiary amine compound (C) | | | | |
| TEDA[1] (wt %) | 20 | 20.0 | 20.0 | 20.0 |
| Solvent | | | | |
| H$_2$O (wt %) | 80 | 74.8 | 67.5 | 61.5 |
| (B)/(C) (molar ratio) | — | 20/80 | 34/66 | 43/57 |

[1]Triethylenediamine (TEDA manufactured by Tosoh Corporation)

The measurement and evaluation results of the physical properties are together shown in Table 19.

TABLE 19

|  | Comparative Examples | | | |
|---|---|---|---|---|
|  | 34 | 35 | 36 | 37 |
| Amount of catalyst added | | | | |
| S-50 (parts by weight) | 1.65 | | | |
| S-51 (parts by weight) | | 1.95 | | |
| S-52 (parts by weight) | | | 3.15 | |
| S-53 (parts by weight) | | | | 5.36 |
| Reactivity | | | | |
| Cream time (sec) | 17 | 18 | 16 | 17 |
| Gel time (sec) | 77 | 81 | 79 | 79 |
| Rise time (sec) | 101 | 109 | 108 | 114 |
| Free foam core density (kg/m$^3$) | 41.9 | 41.9 | 41.2 | 39.4 |
| Mold foam overall density (kg/m$^3$) | 54.7 | 54.7 | 54.7 | 54.5 |
| Cell openness properties and initial curing properties of foam | | | | |
| FTC (65% compression) | | | | |
| Compression stress (first time)(kN/m$^2$) | 75 | 71 | 66 | 61 |
| Compression stress (10th time)(kN/m$^2$) | 19 | 16 | 14 | 11 |

In Comparative Example 34 wherein triethylenediamine corresponding to the tertiary amine compound (C) was used alone, the obtained flexible polyurethane foam was poor in the cell openness properties, although it was excellent in the initial curing properties.

In Comparative Examples 35 to 37 wherein the catalyst compositions comprising salicylic acid corresponding to the hydroxy acid (B) and triethylenediamine corresponding to the tertiary amine compound (C), were used without using the amine compound (A), the obtained flexible polyurethane foams failed to have both the cell openness properties and the initial curing properties improved simultaneously.

Comparative Examples 38 to 41

In the same manner as in Example 1, flexible polyurethane foams were prepared, and the measurements and evaluations of the physical properties were carried out.

The catalyst composition was prepared by blending and dissolving the reagents shown in Table 20, and was used for the preparation of a flexible polyurethane foam.

TABLE 20

| Catalyst | S-54 | S-55 | S-56 | S-57 |
|---|---|---|---|---|
| Amine compound (A) | | | | |
| DMAPA$^{(1)}$ (wt %) | 40.0 | 40.0 | 40.0 | 35.0 |
| Hydroxy acid (B) | | | | |
| Salicylic acid (wt %) | — | 13.5 | 27.0 | 35.5 |
| Solvent | | | | |
| H$_2$O (wt %) | 60.0 | 46.5 | 33.0 | 29.5 |
| (A)/(B) (molar ratio) | — | 80/20 | 67/33 | 57/43 |

$^{(1)}$N,N-dimethylpropanediamine (manufactured by Wako Pure Chemical Industries, Ltd.)

The measurement and evaluation results of the physical properties are together shown in Table 21.

TABLE 21

|  | Comparative Examples | | | |
|---|---|---|---|---|
|  | 38 | 39 | 40 | 41 |
| Amount of catalyst added | | | | |
| S-54 (parts by weight) | 2.25 | | | |
| S-55 (parts by weight) | | 3.10 | | |
| S-56 (parts by weight) | | | 5.05 | |
| S-57 (parts by weight) | | | | 11.80 |
| Reactivity | | | | |
| Cream time (sec) | 15 | 14 | 11 | 9 |
| Gel time (sec) | 77 | 81 | 80 | 113 |
| Rise time (sec) | 90 | 111 | 123 | 139 |
| Free foam core density (kg/m$^3$) | 44.4 | 42.4 | 42.1 | 46.2 |
| Mold foam overall density (kg/m$^3$) | 54.9 | 54.7 | 54.9 | — |
| Cell openness properties and initial curing properties of foam | | | | |
| FTC (65% compression) | | | | |
| Compression stress (first time)(kN/m$^2$) | 12 | 8 | 5 | — |
| Compression stress (10th time)(kN/m$^2$) | 12 | 9 | 6 | — |

In Comparative Example 38 wherein N,N-dimethylpropanediamine corresponding to the amine compound (A) was used alone, the obtained flexible polyurethane foam was poor in the initial curing properties, although it was excellent in the cell openness properties.

In Comparative Examples 39 to 41 wherein the catalyst compositions having N,N-dimethylpropanediamine corresponding to the amine compound (A) and salicylic acid corresponding to the hydroxy acid (B) mixed, were used, the obtained flexible polyurethane foams were poor in the initial curing properties, although they were excellent in the cell openness properties.

Comparative Examples 42 to 48

In the same manner as in Example 1, flexible polyurethane foams were prepared, and the measurements and evaluations of the physical properties were carried out.

The catalyst composition was prepared by blending and dissolving the reagents shown in Table 22, and was used for the preparation of a flexible polyurethane foam.

TABLE 22

|  | Catalyst | | | | | | |
|---|---|---|---|---|---|---|---|
|  | S-58 | S-59 | S-60 | S-61 | S-62 | S-63 | S-64 |
| Amine compound (A) | | | | | | | |
| DMAPA$^{(1)}$ (wt %) | — | 9.1 | 12.2 | 18.2 | 27.3 | 36.4 | 50.0 |
| Tertiary amine compound (C) | | | | | | | |
| TEDA$^{(2)}$ (wt %) | 20.0 | 20.0 | 20.0 | 20.0 | 20.0 | 20.0 | — |
| Solvent | | | | | | | |
| H$_2$O (wt %) | 80.0 | 70.9 | 67.8 | 61.8 | 52.7 | 43.6 | 50.0 |
| (A)/(C) (molar ratio) | — | 33/67 | 40/60 | 50/50 | 60/40 | 67/33 | — |

$^{(1)}$N,N-dimethylpropanediamine (manufactured by Wako Pure Chemical Industries, Ltd.)
$^{(2)}$Triethylenediamine (TEDA manufactured by Tosoh Corporation)

The measurement and evaluation results of the physical properties are together shown in Table 23.

TABLE 23

| | Comparative Examples | | | | | | |
|---|---|---|---|---|---|---|---|
| | 42 | 43 | 44 | 45 | 46 | 47 | 48 |
| Amount of catalyst added | | | | | | | |
| S-58 (parts by weight) | 1.65 | | | | | | |
| S-59 (parts by weight) | | 1.41 | | | | | |
| S-60 (parts by weight) | | | 1.34 | | | | |
| S-61 (parts by weight) | | | | 1.16 | | | |
| S-62 (parts by weight) | | | | | 1.00 | | |
| S-63 (parts by weight) | | | | | | 0.97 | |
| S-64 (parts by weight) | | | | | | | 1.80 |
| Reactivity | | | | | | | |
| Cream time (sec) | 16 | 16 | 16 | 16 | 16 | 15 | 15 |
| Gel time (sec) | 77 | 76 | 76 | 77 | 78 | 76 | 76 |
| Rise time (sec) | 106 | 103 | 101 | 103 | 103 | 100 | 94 |
| Free foam core density (kg/m$^3$) | 41.5 | 41.6 | 41.5 | 42.0 | 42.3 | 40.8 | 42.8 |
| Mold foam overall density (kg/m$^3$) | 54.7 | 54.7 | 54.6 | 54.7 | 54.8 | 54.5 | 54.7 |
| Cell openness properties and initial curing properties of foam | | | | | | | |
| FTC (65% compression) | | | | | | | |
| Compression stress (first time) (kN/m$^2$) | 80 | 87 | 81 | 74 | 47 | 46 | 11 |
| Compression stress (10th time) (kN/m$^2$) | 19 | 21 | 20 | 20 | 13 | 13 | 11 |

In Comparative Example 42 wherein triethylenediamine corresponding to the tertiary amine compound (C) was used alone, the obtained flexible polyurethane foam was poor in the cell openness properties, although it was excellent in the initial curing properties.

In Comparative Examples 43 to 48 wherein the catalyst compositions having N,N-dimethylpropanediamine corresponding to the amine compound (A) and triethylenediamine corresponding to the tertiary amine compound (C) mixed, were used, the obtained flexible polyurethane foams failed to have both the cell openness properties and the initial curing properties improved simultaneously.

Calculation of Gelling Reaction Rate Constant

Reference Example 1

Into a 200 ml Erlenmeyer flask flushed with nitrogen, 50 ml of a DEG-containing benzene solution having the diethylene glycol (DEG) concentration adjusted to be 0.15 mol/L was sampled, and 39.3 mg (0.35 mmol) of triethylenediamine (TEDA manufactured by Tosoh Corporation) was added thereto to obtain liquid A.

Then, into a 100 ml Erlenmeyer flask flushed with nitrogen, 50 ml of a TDI-containing benzene solution having the 2,6-toluene diisocyanate (TDI) concentration adjusted to be 0.15 mol/L was sampled and designated as liquid B.

Liquid A and liquid B were, respectively, kept warm at 30° C. for 30 minutes, and then, liquid B was added to liquid A, and a reaction was initiated with stirring. Every ten minutes after the initiation of the reaction, about 10 ml of the reaction solution was sampled, and unreacted isocyanate was reacted with an excess di-n-butylamine (DBA) solution, whereupon the remaining DBA was back-titrated with a 0.2N hydrochloric acid ethanol solution to quantitatively analyze the amount of the unreacted isocyanate.

As mentioned above, on the assumption that the reaction (gelling reaction) of an isocyanate and an alcohol is linear to the respective concentrations, the reaction rate constant k (L/mol·h) was obtained. Further, the rate constant per catalyst Kc (L$^2$/eq·mol·h) was obtained by dividing the reaction rate constant k by the catalyst concentration. Further, Kc was divided by the molecular weight of catalyst to obtain a gelling reaction rate constant k1w (L$^2$/g·mol·h) which may be deemed to be the activity power per weight. The results are shown in Table 24.

TABLE 24

| | Reference Examples | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Catalyst | | | | | | | | | | | | | | | |
| TEDA[1] (mmol) | 0.35 | | | | | | | | | | | | | | |
| TMEDA[2] (mmol) | | 0.35 | | | | | | | | | | | | | |
| TMPDA[3] (mmol) | | | 0.35 | | | | | | | | | | | | |
| TMHMDA[4] (mmol) | | | | 0.35 | | | | | | | | | | | |
| BDMAPA[5] (mmol) | | | | | 0.35 | | | | | | | | | | |
| TMG[6] (mmol) | | | | | | 0.35 | | | | | | | | | |
| DMP[7] (mmol) | | | | | | | 0.35 | | | | | | | | |
| NMMO[8] (mmol) | | | | | | | | 0.35 | | | | | | | |
| MHEP[9] (mmol) | | | | | | | | | 0.35 | | | | | | |
| NEMO[10] (mmol) | | | | | | | | | | 0.35 | | | | | |
| DMAEMO[11] (mmol) | | | | | | | | | | | 0.35 | | | | |
| DMIZ[12] (mmol) | | | | | | | | | | | | 0.35 | | | |
| DPTAEO[13] mmol) | | | | | | | | | | | | | 0.35 | | |

TABLE 24-continued

| | Reference Examples | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| DBU[14] (mmol) | | | | | | | | | | | | | | 0.35 | |
| DMEA[15] (mmol) | | | | | | | | | | | | | | | 0.35 |
| DEG[16] (mmol) | 7.5 | 7.5 | 7.5 | 7.5 | 7.5 | 7.5 | 7.5 | 7.5 | 7.5 | 7.5 | 7.5 | 7.5 | 7.5 | 7.5 | 7.5 |
| Isocyanate | | | | | | | | | | | | | | | |
| TDI[17] (mmol) | 7.5 | 7.5 | 7.5 | 7.5 | 7.5 | 7.5 | 7.5 | 7.5 | 7.5 | 7.5 | 7.5 | 7.5 | 7.5 | 7.5 | 7.5 |
| Reaction rate constant ($L^2$/g · mol · h) | | | | | | | | | | | | | | | |
| k1w × 10 (gelling) | 10.90 | 4.19 | 4.50 | 2.95 | 2.29 | 6.77 | 1.27 | 0.37 | 0.55 | 0.22 | 0.93 | 3.84 | 3.59 | 96.80 | 2.91 |

[1]Triethylenediamine (TEDA manufactured by Tosoh Corporation)
[2]N,N,N',N'-tetramethylethylenediamine (TOYOCAT-TE manufactured by Tosoh Corporation)
[3]N,N,N',N'-tetramethylpropanediamine (manufactured by Wako Pure Chemical Industries, Ltd.)
[4]N,N,N',N'-tetramethylhexamethylenediamine (TOYOCAT-MR manufactured by Tosoh Corporation)
[5]Bis(N,N-dimethyl-3-aminopropyl)amine (manufactured by Aldrich)
[6]Tetramethylguanidine (manufactured by Wako Pure Chemical Industries, Ltd.)
[7]N,N'-dimethylpiperazine (manufactured by Tokyo Chemical Industry Co., Ltd.)
[8]N-methylmorpholine (manufactured by Tokyo Chemical Industry Co., Ltd.)
[9]N-methyl-N'-(2-hydroxyethyl)piperazine 90 wt % aqueous solution (TOYOCAT-HPW manufactured by Tosoh Corporation)
[10]N-ethylmorpholine (manufactured by Tokyo Chemical Industry Co., Ltd.)
[11]N-(N',N'-dimethylaminoethyl)morpholine (synthesized product)
[12]1,2-Dimethylimidazole (TOYOCAT-DMI manufactured by Tosoh Corporation)
[13]N,N-bis(3-dimethylaminopropyl)aminoethanol (manufactured by Aldrich)
[14]1,8-Diazabicyclo[5.4.0]undecene-7 (manufactured by Aldrich)
[15]Dimethylaminoethanol (manufactured by Tokyo Chemical Industry Co., Ltd.)
[16]Diethylene glycol (manufactured by Kishida Chemical Co., Ltd.)
[17]2,6-Toluene diisocyanate (manufactured by Tokyo Chemical Industry Co., Ltd.)

Reference Examples 2 to 15

The gelling reaction rate constant k1w was calculated in the same manner as in Reference Example 1 except that the tertiary amine compound shown in Table 24 was used as the catalyst. The results are also shown in Table 24.

N—(N',N'-dimethylaminoethyl)morpholine as a tertiary amine (synthesized product) used in Reference Example 11 can easily be produced by a method known in a literature. For example, N—(N',N'-dimethylaminoethyl)morpholine is obtainable from 2-morpholinoethylamine by carrying out a reductive methylation reaction.

Calculation of Blowing Reaction Rate Constant

Reference Example 16

Into a 200 ml Erlenmeyer flask flushed with nitrogen, 100 ml of a water-containing benzene solution having the water concentration adjusted to be 0.078 mol/L was sampled, and 39.3 mg (0.35 mmol) of triethylenediamine (TEDA manufactured by Tosoh Corporation) was added thereto to obtain liquid A.

Then, into a 100 ml Erlenmeyer flask flushed with nitrogen, 10 ml of a TDI-containing benzene solution having the 2,6-toluene diisocyanate (TDI) concentration adjusted to be 0.78 mol/L was sampled and designated as liquid B.

Liquid A and liquid B were, respectively, kept warm at 30° C. for 30 minutes, and then, liquid B was added to liquid A, and a reaction was initiated with stirring. Every ten minutes after the initiation of the reaction, about 10 ml of the reaction solution was sampled, and unreacted isocyanate was reacted with an excess di-n-butylamine (DBA) solution, whereupon the remaining DBA was back-titrated with a 0.2N hydrochloric acid ethanol solution to quantitatively analyze the amount of the unreacted isocyanate.

As mentioned above, on the assumption that the reaction (blowing reaction) of an isocyanate and water is linear to the respective concentrations, the reaction rate constant k (L/mol·h) was obtained. Further, the rate constant per catalyst Kc ($L^2$/eq·mol·h) was obtained by dividing the reaction rate constant k by the catalyst concentration. Further, Kc was divided by the molecular weight of catalyst to obtain k2w ($L^2$/g·mol·h) which may be deemed to be the activity power per weight. The results are shown in Table 25.

TABLE 25

| | Reference Examples | | | | | | | | | | | | | | |
|---|---|---|---|---|---|---|---|---|---|---|---|---|---|---|---|
| | 16 | 17 | 18 | 19 | 20 | 21 | 22 | 23 | 24 | 25 | 26 | 27 | 28 | 29 | 30 |
| Catalyst | | | | | | | | | | | | | | | |
| TEDA[1] (mmol) | 0.35 | | | | | | | | | | | | | | |
| TMEDA[2] (mmol) | | 0.35 | | | | | | | | | | | | | |
| TMPDA[3] (mmol) | | | 0.35 | | | | | | | | | | | | |
| TMHMDA[4] (mmol) | | | | 0.35 | | | | | | | | | | | |
| BDMAPA[5] (mmol) | | | | | 0.35 | | | | | | | | | | |
| TMG[6] (mmol) | | | | | | 0.35 | | | | | | | | | |
| DMP8[7] (mmol) | | | | | | | 0.35 | | | | | | | | |
| NMMO[8] (mmol) | | | | | | | | 0.35 | | | | | | | |
| MHEP[9] (mmol) | | | | | | | | | 0.35 | | | | | | |

TABLE 25-continued

| | Reference Examples | | | | | | | | | | | | | | |
|---|---|---|---|---|---|---|---|---|---|---|---|---|---|---|---|
| | 16 | 17 | 18 | 19 | 20 | 21 | 22 | 23 | 24 | 25 | 26 | 27 | 28 | 29 | 30 |
| NEMO[10] (mmol) | | | | | | | | | | 0.35 | | | | | |
| DMAEMO[11] (mmol) | | | | | | | | | | | 0.35 | | | | |
| DMIZ[12] (mmol) | | | | | | | | | | | | 0.35 | | | |
| DPTAEO[13] (mmol) | | | | | | | | | | | | | 0.35 | | |
| DBU[14] (mmol) | | | | | | | | | | | | | | 0.35 | |
| DMEA[15] (mmol) | | | | | | | | | | | | | | | 0.35 |
| Water (mmol) | 7.8 | 7.8 | 7.8 | 7.8 | 7.8 | 7.8 | 7.8 | 7.8 | 7.8 | 7.8 | 7.8 | 7.8 | 7.8 | 7.8 | 7.8 |
| Isocyanate | | | | | | | | | | | | | | | |
| TDI[16] (mmol) | 7.8 | 7.8 | 7.8 | 7.8 | 7.8 | 7.8 | 7.8 | 7.8 | 7.8 | 7.8 | 7.8 | 7.8 | 7.8 | 7.8 | 7.8 |
| Reaction rate constant ($L^2/g \cdot mol \cdot h$) | | | | | | | | | | | | | | | |
| k2w × 10 (blowing) | 1.45 | 1.14 | 0.99 | 0.84 | 0.28 | 0.71 | 0.28 | 0.10 | 0.10 | 0.01 | 0.08 | 0.29 | 0.86 | 2.20 | 0.36 |

[1]Triethylenediamine (TEDA manufactured by Tosoh Corporation)
[2]N,N,N',N'-tetramethylethylenediamine (TOYOCAT-TE manufactured by Tosoh Corporation)
[3]N,N,N',N'-tetramethylpropanediamine (manufactured by Wako Pure Chemical Industries, Ltd.)
[4]N,N,N',N'-tetramethylhexamethylenediamine (TOYOCAT-MR manufactured by Tosoh Corporation)
[5]Bis(N,N-dimethyl-3-aminopropyl)amine (manufactured by Aldrich)
[6]Tetramethylguanidine (manufactured by Wako Pure Chemical Industries, Ltd.)
[7]N,N'-dimethylpiperazine (manufactured by Tokyo Chemical Industry Co., Ltd.)
[8]N-methylmorpholine (manufactured by Tokyo Chemical Industry Co., Ltd.)
[9]N-methyl-N'-(2-hydroxyethyl)piperazine 90 wt % aqueous solution (TOYOCAT-HPW manufactured by Tosoh Corporation)
[10]N-ethylmorpholine (manufactured by Tokyo Chemical Industry Co., Ltd.)
[11]N-(N',N'-dimethylaminoethyl)morpholine (synthesized product)
[12]1,2-Dimethylimidazole (TOYOCAT-DMI manufactured by Tosoh Corporation)
[13]N,N-bis(3-dimethylaminopropyl)aminoethanol (manufactured by Aldrich)
[14]1,8-Diazabicyclo[5.4.0]undecene-7 (manufactured by Aldrich)
[15]Dimethylaminoethanol (manufactured by Tokyo Chemical Industry Co., Ltd.)
[16]2,6-Toluene diisocyanate (manufactured by Tokyo Chemical Industry Co., Ltd.)

Reference Examples 17 to 30

The blowing reaction rate constant k2w was calculated in the same manner as in Reference Example 16 except that the tertiary amine compound shown in Table 25 was used as the catalyst. The results are also shown in Table 25.

(Calculation of Blowing/Gelling Activity Ratio)

From the results in Tables 24 and 25, the blowing/gelling activity ratio of each tertiary amine compound (=[gelling reaction rate constant k1w/blowing reaction rate constant k2w]) was obtained. The results thereof are also shown in Table 26.

TABLE 26

| | Reaction rate constant ($L^2/g \cdot mol \cdot h$) | | blowing/gelling |
|---|---|---|---|
| Catalyst | k1w × 10 (gelling) | k2w × 10 (blowing) | activity ratio k2w/k1w |
| TEDA[1] | 10.90 | 1.45 | 0.13 |
| TMEDA[2] | 4.19 | 1.14 | 0.27 |
| TMPDA[3] | 4.50 | 0.99 | 0.22 |
| TMHMDA[4] | 2.95 | 0.84 | 0.28 |
| BDMAPA[5] | 2.29 | 0.28 | 0.12 |
| TMG[6] | 6.77 | 0.71 | 0.10 |
| DMP[7] | 1.27 | 0.28 | 0.22 |
| NMMO[8] | 0.37 | 0.10 | 0.27 |
| MHEP[9] | 0.55 | 0.10 | 0.18 |
| NEMO[10] | 0.22 | 0.01 | 0.05 |
| DMAEMO[11] | 0.93 | 0.08 | 0.09 |
| DMIZ[12] | 3.84 | 0.29 | 0.08 |
| DPTAEO[13] | 3.59 | 0.86 | 0.24 |
| DBU[14] | 96.80 | 2.20 | 0.02 |
| DMEA[15] | 2.91 | 0.36 | 0.12 |

[1]Triethylenediamine (TEDA manufactured by Tosoh Corporation)
[2]N,N,N',N'-tetramethylethylenediamine (TOYOCAT-TE manufactured by Tosoh Corporation)
[3]N,N,N',N'-tetramethylpropanediamine (manufactured by Wako Pure Chemical Industries, Ltd.)
[4]N,N,N',N'-tetramethylhexamethylenediamine (TOYOCAT-MR manufactured by Tosoh Corporation)
[5]Bis(N,N-dimethyl-3-aminopropyl)amine (manufactured by Aldrich)
[6]Tetramethylguanidine (manufactured by Wako Pure Chemical Industries, Ltd.)
[7]N,N'-dimethylpiperazine (Tokyo Chemical Industry Co., Ltd.)
[8]N-methylmorpholine (Tokyo Chemical Industry Co., Ltd.)
[9]N-methyl-N'-(2-hydroxyethyl)piperazine 90% aqueous solution (TOYOCAT-HPW manufactured by Tosoh Corporation)
[10]N-ethylmorpholine (Tokyo Chemical Industry Co., Ltd.)
[11]N-(N',N'-dimethylaminoethyl)morpholine (synthesized product)
[12]1,2-Dimethylimidazole (TOYOCAT-DMI manufactured by Tosoh Corporation)
[13]N,N-bis(3-dimethylaminopropyl)aminoethanol (manufactured by Aldrich)
[14]1,8-Diazabicyclo[5.4.0]undecene-7 (manufactured by Aldrich)
[15]Dimethylaminoethanol (Tokyo Chemical Industry Co., Ltd.)

INDUSTRIAL APPLICABILITY

A polyurethane resin (polyurethane foam) obtained by using the catalyst composition of the present invention is excellent in the cell openness properties and also excellent in the initial curing properties, and particularly, a flexible polyurethane foam is light in weight and excellent also in elasticity and thus is useful widely for products such as vehicles, furniture, bedclothes, cushions, etc.

The entire disclosure of Japanese Patent Application No. 2012-146992 filed on Jun. 29, 2012 including specification, claims and summary is incorporated herein by reference in its entirety.

The invention claimed is:

1. A catalyst composition for polyurethane resin production, which comprises an amine compound (A) represented by the following formula (1):

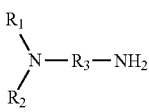  (1)

wherein in the formula (1), each of $R_1$ and $R_2$ which are independent of each other, is a methyl group or an ethyl group, and $R_3$ is a $C_{2-4}$ linear or branched alkyl group, a hydroxy acid (B) represented by the following formula (2):

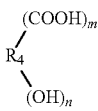  (2)

wherein in the formula (2), $R_4$ is a $C_{1-18}$ bivalent hydrocarbon residue, m is an integer of from 1 to 3, and n is an integer of from 1 to 6, and a tertiary amine compound (C) with a value of (blowing reaction rate constant/gelling reaction rate constant) being at most 0.3, and
wherein the tertiary amine compound with a value of (blowing reaction rate constant/gelling reaction rate constant) being at most 0.3 is at least one member selected from the group consisting of N,N,N',N'-tetramethylethylenediamine, N,N,N',N'-tetramethylhexamethylenediamine, triethylenediamine, 1,8-diazabicyclo[5.4.0]undecene-7 and 1,2-dimethylimidazole.

2. The catalyst composition for polyurethane resin production according to claim 1, wherein the mixing ratio of the amine compound (A), the hydroxy acid (B) and the tertiary amine compound (C) is within a range of (total content of the amine compound (A) and the hydroxy acid (B)/content of the tertiary amine compound (C))=from 30/70 to 75/25 (molar ratio).

3. The catalyst composition for polyurethane resin production according to claim 1, wherein the mixing ratio of the amine compound (A) and the hydroxy acid (B) is within a range of (content of the amine compound (A)/content of the hydroxy acid (B))=from 30/70 to 90/10 (molar ratio).

4. The catalyst composition for polyurethane resin production according to claim 1, wherein the amine compound (A) is at least one member selected from the group consisting of N,N-dimethylethylenediamine, N,N-dimethylpropanediamine, N,N-diethylpropanediamine and N,N-dimethylbutanediamine.

5. The catalyst composition for polyurethane resin production according to claim 1, wherein the hydroxy acid (B) is at least one member selected from the group consisting of glyceric acid, hydroxybutyric acid, malic acid, salicylic acid, 3-hydroxybenzoic acid and 4-hydroxybenzoic acid.

6. A method for producing a polyurethane resin, which comprises reacting a polyol and an organic polyisocyanate in the presence of the catalyst composition as defined in claim 1.

7. The method for producing a polyurethane resin according to claim 6, wherein the amount of the catalyst composition to be used, is within a range of from 0.1 to 20 parts by weight per 100 parts by weight of the polyol.

8. The method for producing a polyurethane resin according to claim 6, wherein the amount of the organic polyisocyanate to be used, is from 70 to 200 by isocyanate index.

9. The method for producing a polyurethane resin according to claim 6, wherein the reaction is conducted in the presence of a blowing agent.

10. The method for producing a polyurethane resin according to claim 6, wherein the blowing agent is water.

11. A flexible polyurethane foam which is obtained by the method as defined in claim 6.

* * * * *